(12) United States Patent
Choi et al.

(10) Patent No.: US 12,331,411 B2
(45) Date of Patent: Jun. 17, 2025

(54) CARBON-SUPPORTED AND SURFACE-ENGINEERED PLATINUM NANOCUBE CATALYST, METHOD FOR PREPARING THE SAME, AND AMMONIA DECOMPOSITION DEVICE INCLUDING THE SAME

(71) Applicant: Kyungpook National University Industry-Academic Cooperation Foundation, Daegu (KR)

(72) Inventors: Sang Il Choi, Daegu (KR); Young Min Hong, Daegu (KR); Hye Jin Lee, Daegu (KR)

(73) Assignee: Kyungpook National University Industry-Academic Cooperation Foundation, Daegu (KR)

(*) Notice: Subject to any disclaimer, the term of this patent is extended or adjusted under 35 U.S.C. 154(b) by 441 days.

(21) Appl. No.: 17/672,769

(22) Filed: Feb. 16, 2022

(65) Prior Publication Data
US 2022/0275525 A1    Sep. 1, 2022

(30) Foreign Application Priority Data

Feb. 19, 2021  (KR) .................. 10-2021-0022263

(51) Int. Cl.
| | | |
|---|---|---|
| *B01J 21/18* | (2006.01) | |
| *B01J 23/42* | (2006.01) | |
| *B01J 23/46* | (2006.01) | |
| *B01J 37/08* | (2006.01) | |
| *C25B 1/02* | (2006.01) | |
| *C25B 11/02* | (2021.01) | |
| *C25B 11/054* | (2021.01) | |

(Continued)

(52) U.S. Cl.
CPC ............. *C25B 11/054* (2021.01); *B01J 23/42* (2013.01); *B01J 37/08* (2013.01); *C25B 1/02* (2013.01); *C25B 11/02* (2013.01); *C25B 11/065* (2021.01); *C25B 11/091* (2021.01); *C25B 11/097* (2021.01)

(58) Field of Classification Search
CPC . B01J 21/18; B01J 23/42; B01J 23/468; B01J 37/08; C25B 11/02; C25B 11/054; C25B 11/065; C25B 11/091; C25B 11/097; C25B 1/02
USPC ........................................................ 502/185
See application file for complete search history.

(56) References Cited

U.S. PATENT DOCUMENTS

| | | | |
|---|---|---|---|
| 8,741,801 B2 * | 6/2014 | Fang ................... | B01J 23/8913 977/773 |
| 9,694,346 B2 * | 7/2017 | Peng ....................... | B01J 23/38 |

(Continued)

FOREIGN PATENT DOCUMENTS

| | | |
|---|---|---|
| KR | 101467061 B1 | 12/2014 |
| KR | 101932575 B1 | 12/2018 |

OTHER PUBLICATIONS

Zanata et al ("Two-step synthesis of Ir-decorated Pd nanocubes and their impact on the glycerol electrooxidation", Journal of Catalysis 377 (2019) 358-366). (Year: 2019).*

(Continued)

*Primary Examiner* — Cam N. Nguyen
(74) *Attorney, Agent, or Firm* — Myers Bigel, P.A.

(57) ABSTRACT

The present invention relates to a carbon-supported and surface-engineered platinum nanocube catalyst having excellent ammonia oxidation activity, a method for preparing the same, and an ammonia decomposition device including the same.

15 Claims, 5 Drawing Sheets

(51) Int. Cl.
C25B 11/065 (2021.01)
C25B 11/091 (2021.01)
C25B 11/097 (2021.01)

(56) References Cited

U.S. PATENT DOCUMENTS

| | | | | |
|---|---|---|---|---|
| 10,454,114 | B2* | 10/2019 | Fang | B01J 23/892 |
| 10,835,955 | B2* | 11/2020 | Xia | B22F 9/16 |
| 11,088,371 | B2* | 8/2021 | Fang | H01M 4/8657 |
| 11,577,309 | B2* | 2/2023 | Xia | B22F 1/17 |
| 2020/0131657 | A1* | 4/2020 | Park | C25B 1/04 |
| 2021/0016355 | A1* | 1/2021 | Chen | B22F 1/0553 |

OTHER PUBLICATIONS

Fomena, Nadege Nzone, et al., "Nanostructured Pt Surfaces with Ir Submonolayers for Enhanced NH3 Electro-oxidation", ChemElectroChem, 4:1327-1333 (2017).

Hong, Youngmin, et al., "Catalytic Surface Specificity of Ni(OH)2-Decorated Pt Nanocubes for the Hydrogen Evolution Reaction in an Alkaline Electrolyte", ChemSusChem, 12:4021-4028 (2019).

Zhong, Cheng, et al., "Shape-controlled synthesis of Pt-Ir nanocubes with preferential (100) orientation and their unusual enhanced electrocatalytic activities", Science China Materials, 57:13-25 (2014).

Siddharth et al. "Surface engineering in improving activity of Pt nanocubes for ammonia electrooxidation reaction" Applied Catalysis B: Environmental 269:118821 (2020) (8 pages).

Chan, Yat Tung, et al., "Investigation of cubic Pt alloys for ammonia oxidation reaction", Nano Research. DOI: 10.1007/s12274-020-2712-1, 8 pages (2020).

Chen, Guangxu, et al., "Carbon monoxide-controlled synthesis of surface-clean Pt nanocubes with high electrocatalytic activity", Chem. Commun., 48: 2758-2760 (2012).

Sacre, Nicolas, et al., "Tuning Pt-Ir interactions for NH3 electrocatalysis", ACS Catalysis, Just Accepted Manuscript. DOI: 10.1021/acscatal.7b02942, 54 pages (2018).

* cited by examiner

CARBON-SUPPORTED AND SURFACE-ENGINEERED PLATINUM NANOCUBE CATALYST, METHOD FOR PREPARING THE SAME, AND AMMONIA DECOMPOSITION DEVICE INCLUDING THE SAME

BACKGROUND

1. Technical Field

This application claims the benefit of the filing date of Korean Patent Application No. 10-2021-0022263 filed with the Korean Intellectual Property Office on Feb. 19, 2021, the entire contents of which are incorporated herein by reference.

The present invention relates to a carbon-supported and surface-engineered platinum nanocube catalyst, a method for preparing the same, and an ammonia decomposition device including the same. Specifically, the present invention relates to a carbon-supported and surface-engineered platinum nanocube catalyst having excellent ammonia oxidation activity, a method for preparing the same, and an ammonia decomposition device including the same.

2. Related Art

Ammonia oxidation reaction (AOR) is of great interest as part of renewable energy systems. This is because ammonia is a potentially suitable carbon-free energy carrier and has a higher volumetric energy density than hydrogen. Ammonia oxidation reaction is the anodic reaction in an ammonia electrolyzer, a direct ammonia fuel cell (DAFC), an ammonia-based sensor, or electrochemical remediation of wastewater, and may be used in a wide range of applications related to energy and environment. The established production, storage, and transport network of ammonia are also big advantages in terms of hydrogen economy. In aqueous alkaline media, ammonia oxidation reaction is a multistep electron-proton transfer reaction with complex kinetics and requires use of electrocatalysts to improve the reaction rate. A lot of mechanism studies through techniques such as in-situ FTIR and surface-enhanced Raman spectroscopy (SERS) have been conducted over the years, leading to efficient catalyst designs for ammonia oxidation reaction. The two most active catalysts are platinum and iridium, but inadequate performance of the electrocatalysts still hinders the commercial application of ammonia oxidation reaction technology. The ammonia oxidation reaction is extremely structure-sensitive and the most active facet is Pt (100). There have been numerous studies on this facet effect as well as platinum-iridium binary electrocatalysts.

Such platinum-iridium binary electrocatalysts are representative of catalyst systems based on platinum-iridium alloys or plating geometries. However, iridium blocks the most active facet Pt (100), making it difficult to obtain good activity, and it is necessary to design the most efficient platinum-iridium system. Furthermore, electrocatalysts for ammonia oxidation reaction have been suffering from long-term stability issues mostly due to the poisoning effect of adsorbed nitrogen. Therefore, there is a need for options to improve its durability.

SUMMARY

An object of the present invention is to provide a carbon-supported and surface-engineered platinum nanocube catalyst having excellent ammonia oxidation activity and durability, a method for preparing the same, and an ammonia decomposition device including the same.

However, objects of the present invention are not limited to the above-mentioned object, and other objects not mentioned herein will be clearly understood by those skilled in the art from the following description.

One embodiment of the present invention provides a carbon-supported and surface-engineered platinum nanocube catalyst including: a carbon-based support; platinum nanocubes supported on the carbon-based support; and individual iridium atoms with which the surfaces of the platinum nanocubes are decorated.

Another embodiment of the present invention provides a method for preparing the carbon-supported and surface-engineered platinum nanocube catalyst, the method including steps of: preparing platinum nanocubes; preparing carbon-supported platinum nanocubes by supporting the platinum nanocubes on carbon; and decorating the surfaces of the carbon-supported platinum nanocube with individual iridium atoms.

Still another embodiment of the present invention provides an ammonia decomposition device including the carbon-supported and surface-engineered platinum nanocube catalyst.

The carbon-supported and surface-engineered platinum nanocube catalyst according to one embodiment of the present invention has excellent ammonia oxidation activity.

The carbon-supported and surface-engineered platinum nanocube catalyst according to one embodiment of the present invention may have improved long-term stability due to its excellent durability.

The method for preparing a carbon-supported and surface-engineered platinum nanocube catalyst according to one embodiment of the present invention may provide a carbon-supported and surface-engineered platinum nanocube catalyst having excellent ammonia oxidation activity.

The method for preparing a carbon-supported and surface-engineered platinum nanocube catalyst according to one embodiment of the present invention may provide a carbon-supported and surface-engineered platinum nanocube catalyst having improved long-term stability due to its excellent durability.

The ammonia decomposition device according to one embodiment of the present invention may have maximized energy efficiency by including a carbon-supported and surface-engineered platinum nanocube catalyst having excellent ammonia oxidation activity.

Effects of the present invention are not limited to the above-described effects, and effects not mentioned herein will be clearly understood by those skilled in the art from the present specification and the accompanying drawings.

DETAILED DESCRIPTION

Figure 1:
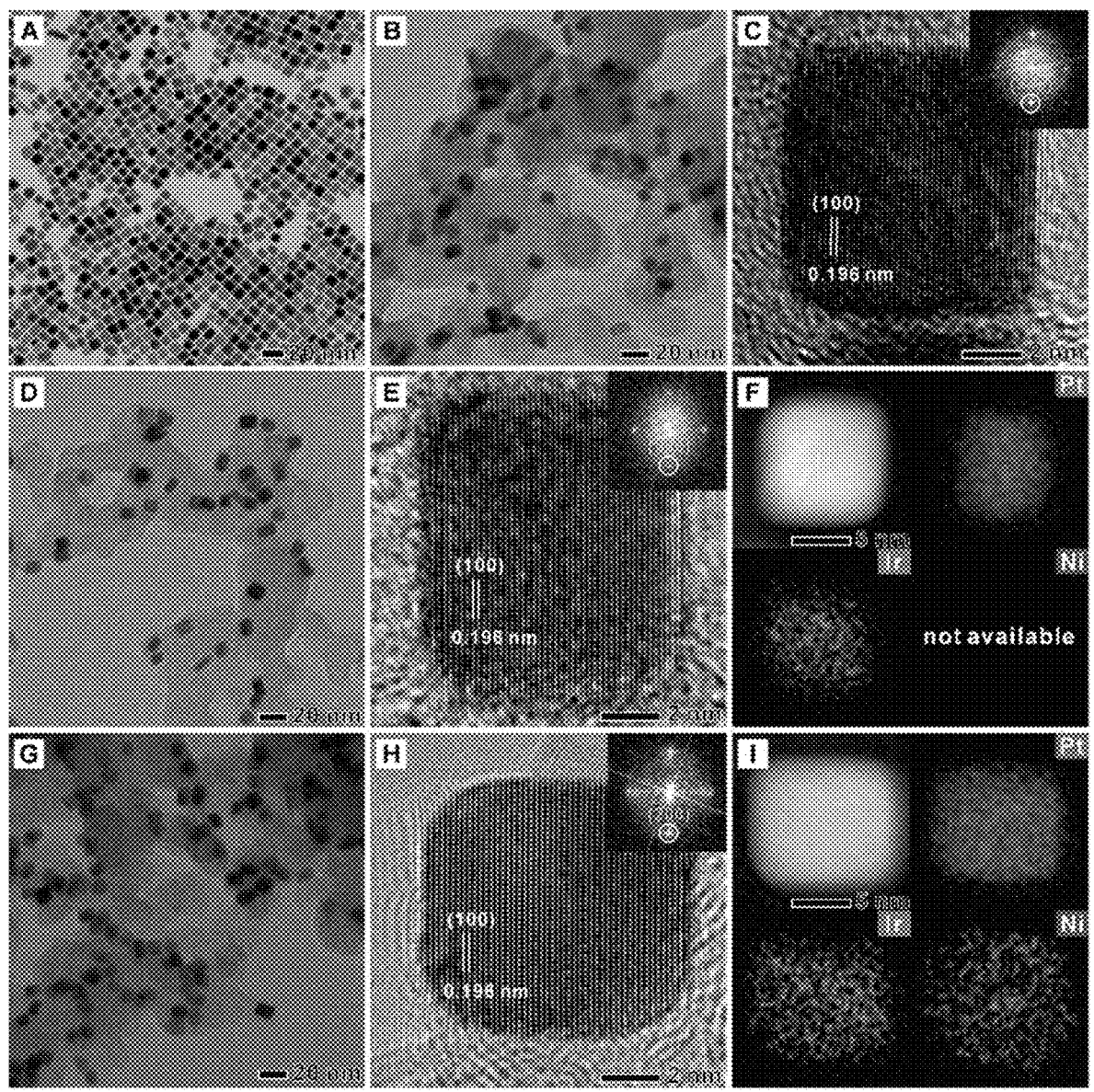
FIG. 1 depicts TEM images of Preparation Example 1, Preparation Example 2, Example 1 and Example 2, HR-TEM images and SAED patterns of Preparation Example 1, Example 1 and Example 2, and EDS mapping images of Example 1 and Example 2.

Throughout the present specification, it is to be understood that when any part is referred to as "including" any component, it does not exclude other components, but may further include other components, unless otherwise specified.

Throughout the present specification, when any member is referred to as being "on" another member, it not only refers to a case where any member is in contact with another member, but also a case where a third member exists between the two members.

Throughout the present specification, the unit "parts by weight" may refer to the ratio of weight between components.

Throughout the present specification, the term "A and/or B" refers to "A and B" or "A or B".

Hereinafter, the present invention will be described in more detail.

One embodiment of the present invention provides a carbon-supported and surface-engineered platinum nanocube catalyst including: a carbon-based support; platinum nanocubes supported on the carbon-based support; and individual iridium atoms with which the surfaces of the platinum nanocubes are decorated.

The carbon-supported and surface-engineered platinum nanocube catalyst according to one embodiment of the present invention may have excellent ammonia oxidation activity and excellent durability, and thus may have improved long-term stability.

According to one embodiment of the present invention, the carbon-based support may be any one selected from among carbon black, Ketjen black, acetylene black, activated carbon powder, carbon nanotubes, carbon nanowires, carbon nanohorns, and fullerene. When the surface-engineered platinum nanocube catalyst is supported on the carbon-based support, the catalyst may have a maximized surface area, and thus may have excellent catalytic activity.

According to an embodiment of the present invention, the platinum nanocube may be a hexahedron having an edge length of 8 nm to 15 nm, 9 nm to 15 nm, 9 nm to 13 nm, 8 nm to 13 nm, 8 nm to 11 nm, 9 to 11 nm, or 10 nm. When the platinum nanocube is a hexahedron having an edge length within the above range, the platinum nanocube may have better catalytic activity by increasing the surface area thereof.

According to one embodiment of the present invention, the platinum nanocube may be one in which the platinum atoms have a face-centered cubic (FCC) lattice structure. That is, the platinum nanocube may be configured to have a crystal structure having one platinum atom at each vertex of the cube and one platinum atom in the center of each face of the cube.

According to one embodiment of the present invention, the platinum nanocube may have a Pt (100) crystal face. The Pt (100) crystal face corresponds to the face having the best ammonia oxidation activity, and thus the ammonia oxidation activity of the carbon-supported and surface-engineered platinum nanocube catalyst may be excellent.

According to an embodiment of the present invention, the weight ratio between the platinum nanocube and the iridium atoms may be 150:1 to 30:1, 150:1 to 40:1, 150:1 to 50:1, 140:1 to 30:1, 140:1 to 40:1, 140:1 to 50:1, 130:1 to 30:1, 130:1 to 40:1, 130:1 to 50:1, 120:1 to 30:1, 120:1 to 40:1, 120:1 to 50:1, 100:1 to 40:1, 100:1 to 50:1, 90:1 to 50:1, 80:1 to 50:1, or 60:1 to 50:1.

According to one embodiment of the present invention, the ratio between the number of the platinum atoms of the platinum nanocube and the number of the iridium atoms may be 150:1 to 30:1, 150:1 to 40:1, 150:1 to 50:1, 140:1 to 30:1, 140:1 to 40:1, 140:1 to 50:1, 130:1 to 30:1, 130:1 to 40:1, 130:1 to 50:1, 120:1 to 30:1, 120:1 to 40:1, 120:1 to 50:1, 100:1 to 40:1, 100:1 to 50:1, 90:1 to 50:1, 80:1 to 50:1, or 60:1 to 50:1.

When the surfaces are decorated with a very small amount of iridium atoms so as to satisfy a weight ratio or atom number ratio value within the above-described range, the ammonia oxidation activity of the carbon-supported and surface-engineered platinum nanocube catalyst may be excellent.

According to one embodiment of the present invention, the nanocube catalyst may further include nickel hydroxide clusters with which the surfaces of the surface-engineered platinum nanocubes are decorated. The surfaces of the platinum nanocubes may be decorated with the nickel hydroxide clusters together with iridium atoms, or empty portions of the platinum surface which are not decorated with iridium atoms may be decorated with the nickel hydroxide clusters.

The nickel hydroxide cluster may be an aggregate including about 3 to about 1,000 nickel hydroxide molecules, and the nickel hydroxide molecules may be bonded together by van der Waals forces.

When the carbon-supported and surface-engineered platinum nanocube catalyst according to one embodiment of the present invention further includes the nickel hydroxide clusters with which the surfaces of the platinum nanocubes are decorated, surface poisoning of the catalyst active site by nitrogen atoms may be prevented, so that the durability of the catalyst may be improved, and thus the long-term stability thereof may be excellent.

The ammonia oxidation reaction onset potential of the carbon-supported and surface-engineered platinum nanocube catalyst according to one embodiment of the present invention may be 0.4 V to 0.6 V. When the catalyst has an onset potential within the above range, it is possible to provide an electrocatalyst with excellent efficiency by which the ammonia oxidation reaction starts to be performed even at a low voltage.

Another embodiment of the present invention provides a method for preparing the carbon-supported and surface-engineered platinum nanocube catalyst, the method including steps of: preparing platinum nanocubes; preparing carbon-supported platinum nanocubes by supporting the platinum nanocube on carbon; and preparing carbon-supported platinum nanocubes surface-decorated with iridium atoms by decorating the surfaces of the carbon-supported platinum nanocubes with iridium atoms.

The method preparing a carbon-supported and surface-engineered platinum nanocube catalyst according to one embodiment of the present invention may provide a carbon-supported and surface-engineered platinum nanocube catalyst having excellent ammonia oxidation activity and having improved long-term stability due to its excellent durability.

Hereinafter, each step will be described in detail.

According to one embodiment of the present invention, the step of preparing the platinum nanocubes may include steps of: heating a first solution containing a platinum precursor to a first temperature; heating the first solution, heated to the first temperature, to a second temperature while bubbling carbon monoxide; and maintaining the first solution, heated to the second temperature, at the second temperature.

According to one embodiment of the present invention, the first solution may include a platinum precursor, and may further include at least one of a solvent, a reducing agent, and a stabilizer. The first solution may be prepared by mixing the platinum precursor and at least one of a solvent, a reducing agent, and a stabilizer. The reducing agent may serve to help the reduction of the platinum precursor, and the stabilizer may serve to adjust the size of the platinum nanocube particles and to evenly disperse the particles without agglomeration.

The reducing agent may include at least one of oleyl amine, 1,2-hexanediol, n-octylamine, and pentadecylamine, and the stabilizer may include at least one of oleic acid, hexadecenoic acid, octadecenoic acid, and octadecadionic acid. In addition, the solvent may include at least one of benzyl ether, phenyl ether, and octadecene.

According to one embodiment of the present invention, the platinum precursor may include at least one of platinum acetylacetonate, potassium tetrachloroplatinate, platinum chloride, sodium tetrachloroplatinate, tetraamine platinum nitrate, and chloroplatinic acid.

According to one embodiment of the present invention, the first solution may contain the platinum precursor in an amount of 1 mg/ml to 5 mg/ml, 1 mg/ml to 4 mg/ml, 2 mg/ml to 5 mg/ml, 1 mg/ml to 3 mg/ml, 2 mg/ml to 4 mg/ml, 1 mg/ml to 2 mg/ml, or 2 mg/ml to 3 mg/ml. When the platinum precursor is contained at a concentration within the above range, one edge of the platinum nanoparticle may be effectively formed to have a length of 8 nm to 15 nm.

According to one embodiment of the present invention, the first solution may contain the reducing agent and the solvent at a volume ratio of 1:2 to 1:5, and contain the stabilizer and the solvent at a volume ratio of 1:5 to 1:10. When the first solution contains the reducing agent, the stabilizer and the solvent at a volume ratio within the above range, there may be an effect of ensuring particle size uniformity and stability.

According to one embodiment of the present invention, the first solution may be heated to a first temperature, and the first temperature may be 100° C. to 150° C., 100° C. to 140° C., 110° C. to 150° C., 100° C. to 130° C., 110° C. to 140° C., 120° C. to 150° C., 110° C. to 130° C., 120° C. to 140° C., 130° C. to 150° C., 120° C. to 130° C., or 130° C. to 140° C. When the first solution is heated to a first temperature within the above range, there may be an effect of ensuring a uniform shape of the platinum nanocube particles.

According to one embodiment of the present invention, stirring may be performed while the first solution is heated to the first temperature. The method of stirring is not particularly limited, and for example, magnetic stirring may be performed.

According to one embodiment of the present invention, the step of heating the first solution to the first temperature may be performed under an inert gas atmosphere. Specifically, the step of heating the first solution to the first temperature may be performed while purging with inert gas. The inert gas is not particularly limited and for example, argon may be used.

According to one embodiment of the present invention, when the first solution reaches the first temperature by heating to the first temperature, purging with the inert gas may be stopped and carbon monoxide bubbling may be performed.

According to one embodiment of the present invention, the first solution heated to the first temperature may be heated to a second temperature while bubbling carbon monoxide. When the first solution is further heated while bubbling carbon monoxide, the platinum nanocube may be formed in a hexahedral shape. In this step, a seed particle that becomes the basic shape of the platinum nanocube may be formed.

According to one embodiment of the present invention, the carbon monoxide bubbling may be performed by injecting carbon monoxide at a flow rate of 20 ml/min to 40 ml/min. When the carbon monoxide bubbling is performed at a flow rate within the above range, the platinum nanocube may be smoothly formed in a hexahedral shape.

According to one embodiment of the present invention, the first solution may be heated to a second temperature while bubbling carbon monoxide, and the second temperature may be 200° C. to 300° C., 200° C. to 280° C., 200° C. to 260° C., 200° C. to 240° C., or 200° C. to 220° C. If the first solution is heated to a second temperature out of the above range, the reduction of the platinum precursor may not be smooth or agglomeration of the formed particles may occur.

According to one embodiment of the present invention, the of heating the first solution to the second temperature may be performed at a heating rate of 5° C./min to 10° C./min, 5° C./min to 9° C./min, 6° C./min to 10° C./min, 5° C./min to 8° C./min, 6° C./min to 9° C./min, 7° C./min to 10° C./min, 6° C./min to 8° C./min, 7° C./min to 9° C./min, 8° C./min to 10° C./min, 7° C./min to 8° C./min, or 8° C./min to 9° C./min. If heating to the second temperature is performed at a heating rate out of the above range, the growth of platinum nanocube particles may not be smooth or it may be difficult to ensure a uniform size and shape of the nanocube.

Next, when the temperature of the first solution reaches the second temperature, carbon monoxide bubbling may be stopped, and the solution may be maintained at the second temperature without additional heating. In this step, the size of the platinum nanocubes may increase, so that the nanocubes may grow in the shape of nanoparticles.

According to one embodiment of the present invention, the step of maintaining the solution at the second temperature may be performed for 30 minutes to 60 minutes, 30 minutes to 50 minutes, 40 minutes to 60 minutes, 30 minutes to 40 minutes, or 40 minutes to 50 minutes. When the solution is maintained at the second temperature for a period of time within the above range, the prepared platinum nanoparticles may grow into a hexahedral shape having an edge length of 8 nm to 15 nm.

According to one embodiment of the present invention, the dispersion containing the platinum nanocubes prepared as described above may be cooled, and the platinum nanocubes may be precipitated by addition of an organic solvent and then collected by centrifugation.

The cooling of the dispersion may be performed at room temperature. Specifically, the dispersion may be naturally cooled by leaving it at room temperature without a separate external energy source.

The organic solvent is not particularly limited, but one or more non-polar organic solvents such as toluene, hexane, benzene, and cyclohexane may be used.

The centrifugation may be performed at 2,000 rpm to 4,000 rpm for 1 minute to 10 minutes.

Using the obtained platinum nanocubes, a carbon-supported and surface-engineered platinum nanocube catalyst according to one embodiment of the present invention may be prepared.

According to one embodiment of the present invention, carbon-supported platinum nanocubes are prepared by supporting the platinum nanocubes on carbon. As the platinum nanocubes are supported on carbon, the catalyst surface area may increase, so that the catalyst activity may be excellent.

According to one embodiment of the present invention, the step of preparing the carbon-supported platinum nanocubes by supporting the platinum nanocubes on carbon may include steps of: redispersing the platinum nanocubes in an organic solvent; adding a carbon-based support to the dispersion, followed by sonication; and washing and drying.

According to one embodiment of the present invention, the platinum nanocubes may be redispersed in an organic solvent. The organic solvent used may be the organic solvent described above, and is not particularly limited.

According to one embodiment of the present invention, after the platinum nanocubes are dispersed, a carbon-based support may be added to the dispersion, followed by sonication. In this process, platinum nanocubes may be supported on carbon.

The carbon-based support may include at least one of carbon black, Ketjen black, acetylene black, activated carbon powder, carbon nanotubes, carbon nanowires, carbon nanohorns, and fullerene, and the sonication may be performed for 1 hour to 3 hours.

According to one embodiment of the present invention, the carbon-based support may be added such that the mass ratio of the platinum nanocubes to the carbon-based support is 1:1 to 1:3. When the carbon-based support is added so as to have a mass ratio within the above range, the platinum nanocube particles may be uniformly distributed on the support, and thus there may be an effect of improving catalytic activity.

According to one embodiment of the present invention, after sonication, the carbon-supported platinum nanocubes may be collected through washing and drying. The washing may be performed using an organic solvent, and the organic solvent may be the one described above. The washing may be repeated 2 to 5 times.

In addition, the drying may be performed at room temperature, and may be performed under an inert gas atmosphere.

According to one embodiment of the present invention, the surfaces of the carbon-supported platinum nanocubes obtained as described above are decorated with iridium atoms.

According to one embodiment of the present invention, the step of preparing carbon-supported platinum nanocubes surface-decorated with iridium atoms by decorating the surfaces of the carbon-supported platinum nanocube with iridium atoms may include steps of: heating a first dispersion containing the carbon-supported platinum nanocubes, a reducing agent and a solvent to a third temperature; and adding a second solution containing an iridium precursor to the first dispersion heated to the third temperature and maintaining the resulting solution at the third temperature.

According to one embodiment of the present invention, a first dispersion containing the carbon-supported platinum nanocubes, a reducing agent, and a solvent is prepared. The reducing agent may serve to increase the oxidation stability of the platinum nanocube particles.

According to one embodiment of the present invention, the reducing agent may include at least one of oleyl amine, 1,2-hexanediol, n-octylamine, and pentadecylamine.

According to one embodiment of the present invention, the solvent may include at least one of benzyl ether, phenyl ether, and octadecene.

According to one embodiment of the present invention, the first dispersion may contain the carbon-supported platinum nanocubes at a concentration of 1 mg/ml to 10 mg/ml, 1 mg/ml to 8 mg/ml, 2 mg/ml to 9 mg/ml, 3 mg/ml to 10 mg/ml, 1 mg/ml to 6 mg/ml, 2 mg/ml to 6 mg/ml, 3 mg/ml to 7 mg/ml, 4 mg/ml to 9 mg/ml, 1 mg/ml to 4 mg/ml, 2 mg/ml to 5 mg/ml, 3 mg/ml to 6 mg/ml, 4 mg/ml to 7 mg/ml, 2 mg/ml to 4 mg/ml, 3 mg/ml to 5 mg/ml, 4 mg/ml to 6 mg/ml, 3 mg/ml to 4 mg/ml, or 4 mg/ml to 5 mg/ml. When the carbon-supported platinum nanocubes are contained at a concentration within the above range, the surfaces thereof may be well decorated with iridium.

According to one embodiment of the present invention, the first dispersion may contain the reducing agent and the solvent at a volume ratio of 4:6 to 6:4. When the reducing agent and the solvent are contained at a volume ratio within the above range, there may be an effect of increasing the oxidation stability of the platinum nanocube particles and evenly dispersing the particles without agglomeration.

According to one embodiment of the present invention, the first dispersion may be heated to a third temperature, and the third temperature may be 200° C. to 300° C., 200° C. to 290° C., 210° C. to 300° C., 200° C. to 280° C., 210° C. to 290° C., 220° C. to 300° C., 200° C. to 270° C., 210° C. to 280° C., 220° C. to 290° C., 230° C. to 300° C., 210° C. to 270° C., 220° C. to 280° C., 230° C. to 290° C., 240° C. to 300° C., 220° C. to 270° C., 230° C. to 280° C., 240° C. to 290° C., 250° C. to 300° C., 230° C. to 270° C., 240° C. to 280° C., 250° C. to 290° C., 260° C. to 300° C., 240° C. to 270° C., 250° C. to 280° C., 260° C. to 290° C., 270° C. to 300° C., 250° C. to 270° C., 260° C. to 280° C., 270° C. to 290° C., 260° C. to 270° C., or 270° C. to 280° C. When the first dispersion is heated to a third temperature within the above range, there may be an effect of decorating the surfaces of the platinum nanocubes with individual iridium atoms while reducing the iridium precursor.

According to one embodiment of the present invention, the first dispersion may be heated to the third temperature at a heating rate of 5° C./min to 15° C./min, 5° C./min to 13° C./min, 7° C./min to 15° C./min, 5° C./min to 11° C./min, 7° C./min to 13° C./min, 9° C./min to 15° C./min, 7° C./min to 11° C./min, 9° C./min to 13° C./min, or 9° C./min to 11° C./min. When the first dispersion is heated at a heating rate within the above range, there may be an effect of maintaining the shape of the platinum nanocube particles without destruction.

According to one embodiment of the present invention, stirring may be performed while the first dispersion is heated to the third temperature. The method of stirring is not particularly limited, and for example, magnetic stirring may be performed.

According to one embodiment of the present invention, the step of heating the first dispersion to the third temperature may be performed under an inert gas atmosphere.

Specifically, the step of heating the first dispersion to the third temperature may be performed while purging with inert gas. The inert gas is not particularly limited, and for example, argon may be used.

According to one embodiment of the present invention, when the temperature of the first dispersion reaches the third temperature, a second solution containing an iridium precursor may be added thereto and maintained at a third temperature.

According to one embodiment of the present invention, the second solution may contain an iridium precursor and a solvent. In this case, the solvent used may be the one described above, and may include at least one of benzyl ether, phenyl ether, and octadecene.

According to one embodiment of the present invention, the iridium precursor may include at least one of iridium acetylacetonate, ammonium hexachloroiridate, potassium hexachloroiridate, pentaaminechloroiridium chloride, iridium chloride, and iridium nitrate.

According to one embodiment of the present invention, the second solution may contain the iridium precursor at a concentration of 0.1 mg/ml to 0.3 mg/ml, 0.1 mg/ml to 0.25 mg/ml, 0.15 mg/ml to 0.3 mg/ml, 0.15 mg/ml to 0.25 mg/ml, 0.2 mg/ml to 0.3 mg/ml, or 0.2 mg/ml to 0.25 mg/ml. When the second solution contains the iridium precursor at a concentration within the above range, there may be an effect of uniformly decorating the surfaces of the platinum nanocube particles with individual iridium atoms.

According to one embodiment of the present invention, the second solution may be added dropwise. That is, the second solution may be added in small amounts at a very low constant rate. For example, the second solution may be added in a volume of 5 ml or less for 30 minutes.

As the second solution is added at a low rate, the surfaces of the carbon-supported platinum nanocube may be decorated with individual iridium atoms.

According to one embodiment of the present invention, the second solution may be added such that the weight ratio of the carbon-supported platinum nanocubes to the iridium precursor is 150:1 to 10:1, 100:1 to 10:1, 50:1 to 10:1, 50:1 to 20:1, 40:1 to 10:1, 50:1 to 30:1, 40:1 to 20:1, or 40:1 to 30:1. When the second solution is added so as to have a weight ratio within the above range, the surfaces of the platinum nanocube may be decorated with individual iridium atoms.

According to one embodiment of the present invention, after the second solution is completely added, the resulting solution may be maintained at a third temperature. In the process of maintaining the solution at the third temperature, iridium atoms may be bonded to the surfaces of the platinum nanocube so that the surfaces may be decorated with iridium atoms.

According to one embodiment of the present invention, the step of maintaining the solution at the third temperature may be performed for 3 hours to 10 hours, 3 hours to 9 hours, 4 hours to 10 hours, 3 hours to 8 hours, 4 hours to 9 hours, hours to 10 hours, 3 hours to 7 hours, 4 hours to 8 hours, hours to 9 hours, 3 hours to 6 hours, 4 hours to 7 hours, hours to 8 hours, 3 hours to 5 hours, 4 hours to 6 hours, hours to 7 hours, 4 hours to 5 hours, or 5 hours to 6 hours. When the second solution is maintained at the third temperature for a period of time within the above range, a sufficient reaction time may be ensured, so that the surfaces of the platinum nanocube may be decorated with individual iridium atoms while the aggregation of iridium atoms may be prevented.

According to one embodiment of the present invention, after completion of the step of maintaining the solution at the third temperature, the dispersion may be cooled, and the carbon-supported platinum nanocubes decorated with iridium atoms may be precipitated by addition of an organic solvent and then collected through centrifugation, washing and drying.

The cooling may be performed at room temperature. Specifically, the dispersion may be naturally cooled by leaving it at room temperature without a separate external energy source.

The organic solvent is not particularly limited, but one or more non-polar organic solvents such as toluene, hexane, benzene, and cyclohexane may be used.

The centrifugation may be performed at 2,000 rpm to 4,000 rpm for 1 minute to 10 minutes.

The washing may be performed using an organic solvent, and the organic solvent used may be the one described above. The washing may be repeated 2 to 5 times.

In addition, the drying may be performed at room temperature, and may be performed under an inert gas atmosphere.

According to one embodiment of the present invention, the method may further include, after the step of preparing carbon-supported platinum nanocubes surface-decorated with iridium atoms by decorating the surfaces of the carbon-supported platinum nanocubes with iridium atoms, a step of decorating the surfaces of the carbon-supported platinum nanocubes, surface-decorated with iridium atoms, with nickel hydroxide clusters. That is, the method may further include a step of decorating the surfaces of the obtained carbon-supported platinum nanocubes, decorated with iridium atoms, with nickel hydroxide clusters.

According to one embodiment of the present invention, the step of decorating the surfaces of the carbon-supported platinum nanocubes, surface-decorated with iridium atoms, with nickel hydroxide clusters may include steps of: heating a second dispersion containing the carbon-supported platinum nanocubes surface-decorated with iridium atoms, a reducing agent, and a solvent to a fourth temperature lower than 200° C.; and adding a third solution containing a nickel precursor to the second dispersion heated to the fourth temperature, and maintaining the resulting solution at the fourth temperature.

According to one embodiment of the present invention, the second dispersion may contain the carbon-supported platinum nanocubes surface-decorated with iridium atoms, a reducing agent, and a solvent. As for the reducing agent and the solvent, the same contents as described above may be applied.

According to one embodiment of the present invention, the second dispersion may contain the carbon-supported platinum nanocubes surface-decorated with iridium atoms at a concentration of 0.1 mg/ml to 1 mg/ml, 0.1 mg/ml to 0.9 mg/ml, 0.2 mg/ml to 1 mg/ml, 0.1 mg/ml to 0.8 mg/ml, 0.2 mg/ml to 0.9 mg/ml, 0.3 mg/ml to 1 mg/ml, 0.1 mg/ml to 0.7 mg/ml, 0.2 mg/ml to 0.8 mg/ml, 0.3 mg/ml to 0.9 mg/ml, 0.4 mg/ml to 1 mg/ml, 0.2 mg/ml to 0.7 mg/ml, 0.3 mg/ml to 0.8 mg/ml, 0.4 mg/ml to 0.9 mg/ml, 0.5 mg/ml to 1 mg/ml, 0.3 mg/ml to 0.7 mg/ml, 0.4 mg/ml to 0.8 mg/ml, 0.5 mg/ml to 0.9 mg/ml, 0.4 mg/ml to 0.7 mg/ml, 0.5 mg/ml to 0.8 mg/ml, 0.6 mg/ml to 0.9 mg/ml, 0.5 mg/ml to 0.7 mg/ml, 0.6 mg/ml to 0.8 mg/ml, or 0.6 mg/ml to 0.7 mg/ml. When the second dispersion contains the carbon-supported platinum nanocubes surface-decorated with iridium atoms at a concentration within the above range, the surfaces of the nanocubes may be well decorated with nickel hydroxide.

According to one embodiment of the present invention, the second dispersion may contain the reducing agent and the solvent at a volume ratio of 4:6 to 6:4. When the reducing agent and the solvent are contained at a volume ratio within the above range, there may be an effect of increasing the oxidation stability of the platinum nanocube particles and evenly dispersing the particles without agglomeration.

According to one embodiment of the present invention, the second dispersion may be heated to a fourth temperature lower than 200° C. Specifically, the fourth temperature may be 100° C. to lower than 200° C., 100° C. to 190° C., 120° C. to lower than 200° C., 120° C. to 190° C., 140° C. to lower than 200° C., 140° C. to 190° C., 160° C. to lower than 200° C., 160° C. to 190° C., 180° C. to lower than 200° C., or 180° C. to 190° C. When the second dispersion is heated to a fourth temperature within the above range, it is possible to prevent the nickel cation of the nickel precursor from being reduced to form metallic nickel.

According to one embodiment of the present invention, the second dispersion may be heated to the fourth temperature at a heating rate of 1° C./min to 15° C./min, 1° C./min to 13° C./min, 3° C./min to 15° C./min, 1° C./min to 11° C./min, 3° C./min. to 13° C./min, 5° C./min to 15° C./min, 1° C./min to 9° C./min, 3° C./min to 11° C./min, 5° C./min to 13° C./min, 7° C./min to 15° C./min, 1° C./min to 7° C./min, 3° C./min to 9° C./min, 5° C./min to 11° C./min, 7° C./min to 13° C./min, 3° C./min to 7° C./min, 5° C./min to 9° C./min, 7° C./min to 11° C./min, 5° C./min to 7° C./min, or 7° C./min to 9° C./min. When the second dispersion is heated at a heating rate within the above range, there may be an effect of maintaining the shape of the carbon-supported platinum nanocube particles surface-decorated with iridium atoms without destruction.

According to one embodiment of the present invention, a third solution containing a nickel precursor may be added to the second dispersion heated to the fourth temperature, and the resulting solution may be maintained at the fourth temperature.

According to one embodiment of the present invention, the third solution may contain a nickel precursor and a polar solvent. The polar solvent is not particularly limited, but may include at least one of benzyl alcohol, triethylene glycol, and tetraethylene glycol.

According to one embodiment of the present invention, the nickel precursor may include at least one of nickel acetate, nickel acetylacetonate, nickel oxalate, nickel chloride, and nickel nitrate.

According to one embodiment of the present invention, the step of maintaining the solution at the fourth temperature may be performed for 10 minutes to 60 minutes, 10 minutes to 50 minutes, 20 minutes to 60 minutes, 10 minutes to 40 minutes, 20 minutes to 50 minutes, 30 minutes to 60 minutes, 10 minutes to 30 minutes, 20 minutes to 40 minutes, 30 minutes to 50 minutes, 20 minutes to 30 minutes, or 30 minutes to 40 minutes. When the solution is maintained at the fourth temperature for a period of time within the above range, a sufficient reaction time may be ensured, so that there may be an effect of decorating the surfaces of the carbon-supported platinum nanocube particles, surface-decorated with iridium atoms, with nickel hydroxide.

According to one embodiment of the present invention, the third solution may contain the niclel precursor at a concentration of 0.5 mg/ml to 1.5 mg/ml, 0.5 mg/ml to 1.3 mg/ml, 0.7 mg/ml to 1.5 mg/ml, 0.7 mg/ml to 1.3 mg/ml, 0.9 mg/ml to 1.5 mg/ml, 0.9 mg/ml to 1.3 mg/ml, 1.1 mg/ml to 1.5 mg/ml, or 1.1 mg/ml to 1.3 mg/ml. When the nickel precursor is contained at a concentration within the above range, there may be an effect of uniformly decorating the surfaces of the carbon-supported platinum nanocube particles, surface-decorated with iridium atoms, with nickel hydroxide.

According to one embodiment of the present invention, the third solution may be added such that the weight ratio of the carbon-supported platinum nanocubes surface-decorated with iridium atoms to the nickel precursor is 50:1 to 10:1, 50:1 to 20:1, 40:1 to 10:1, 50:1 to 30:1, 40:1 to 20:1, or 30:1 to 20:1. When the third solution is added so as to have a weight ratio within the above range, the surfaces of the carbon-supported platinum nanocubes surface-decorated with iridium atoms may be decorated with the nickel hydroxide clusters.

According to one embodiment of the present invention, after completion of the step of maintaining the solution at the fourth temperature, the dispersion may be cooled, and the carbon-supported platinum nanocubes surface-decorated with nickel hydroxide may be precipitated by addition of an organic solvent, and then collected through centrifugation washing and drying.

The cooling may be performed at room temperature. Specifically, the dispersion may be naturally cooled by leaving it at room temperature without a separate external energy source.

The organic solvent is not particularly limited, but one or more non-polar organic solvents such as toluene, hexane, benzene, and cyclohexane may be used.

The centrifugation may be performed at 2,000 rpm to 4,000 rpm for 1 minute to 10 minutes.

The washing may be performed using an organic solvent. Here, the organic solvent may be the one described above, and the washing may be repeated 2 to 5 times.

In addition, the drying may be performed at room temperature, and may be performed under an inert gas atmosphere.

Another embodiment of the present invention provides an ammonia decomposition device including the carbon-supported and surface-engineered platinum nanocube catalyst. Specifically, the ammonia decomposition device according to one embodiment of the present invention may include an oxidation electrode including the carbon-supported and surface-engineered platinum nanocube catalyst.

As the ammonia decomposition device according to one embodiment of the present invention includes the carbon-supported and surface-engineered platinum nanocube catalyst having excellent ammonia oxidation activity, the energy efficiency thereof may be maximized.

Since the ammonia decomposition device according to one embodiment of the present invention includes the carbon-supported and surface-engineered platinum nanocube catalyst, it may have very good ammonia oxidation activity, and may produce a large amount of hydrogen by using a small amount of energy due to its excellent energy efficiency.

According to one embodiment of the present invention, nitrogen and hydrogen may be produced by oxidizing ammonia on the surface of the oxidation electrode including the carbon-supported and surface-engineered platinum nanocube catalyst.

According to an embodiment of the present invention, the ammonia decomposition device may further include a hydrogen storage unit. The ammonia decomposition device may include the hydrogen storage device to store hydrogen produced by ammonia oxidation.

According to one embodiment of the present invention, the ammonia decomposition device may be applied to a fuel cell system. Hydrogen may be produced by decomposing ammonia, the produced hydrogen may be stored, and if necessary, the stored hydrogen may be supplied to a fuel cell and used as energy.

Hereinafter, the present invention will be described in detail with reference to examples. However, the examples according to the present invention may be modified into various different forms, and the scope of the present invention is not interpreted as being limited to the examples described below. The examples of the present specification are provided to more completely explain the present invention to those skilled in the art.

Raw Materials Used

Platinum(II) acetylacetonate ($Pt(acac)_2$, Pt 48.0 wt %), iridium(III) acetylacetonate ($Ir(acac)_3$, Ir 37.5 wt %), and nickel(II) nitrate hexahydrate ($Ni(NO_3)_2 \cdot 6H_2O$, 98%) were procured from Alfa Aesar. Oleic acid (OAc, 90%), oleylamine (OAm, 70%), benzyl alcohol (BA, ≥99%), and benzyl ether (BE, 98%) were purchased from Sigma-Aldrich.

All raw materials were used without further treatment.

Preparation Example 1: Preparation of Platinum Nanocubes (Pt NCs)

$Pt(acac)_2$ (40.0 mg), oleylamine (4.0 mL) and oleic acid (2.0 mL) were added to benzyl ether (14.0 mL), mixed together, and then heated to 130° C. under an argon atmosphere with magnetic stirring. When the temperature reached 130° C., purging with argon gas was stopped and carbon monoxide gas bubbling at a flow rate of 30 ml/min was performed. The mixture was heated to 210° C. at a rate of 8° C./min under a carbon monoxide atmosphere, and kept for 40 minutes without carbon monoxide gas bubbling. The resulting dispersion was naturally cooled to room temperature, and then toluene (5 mL) and ethanol (10 mL) were sequentially added thereto to precipitate the platinum nanocubes. The supernatant was removed by centrifugation at 3,000 rpm for 5 minutes, and the platinum nanocubes (Pt NCs) were collected.

Preparation Example 2: Preparation of Carbon-Supported Platinum Nanocubes (Pt NCs/C)

The obtained platinum nanocubes were redispersed in toluene, and then added to a toluene solution containing carbon black (Vulcan XC-72R) so that the weight ratio of the platinum nanocubes to the carbon black was 1:2, followed by mixing. The mixture was agitated by ultrasonic waves for 2 hours to prepare carbon-supported platinum nanocubes. The carbon-supported platinum nanocubes (Pt NCs/C) were collected through washing three times with ethanol and toluene and then drying at room temperature under an argon atmosphere.

Example 1: Preparation of Carbon-Supported Platinum Nanocubes Surface-Decorated with Iridium (Ir—Pt NCs/C)

The carbon-supported platinum nanocubes (20.0 mg) prepared in Preparation Example 2, oleylamine (5.0 mL), and benzylether (5.0 mL) were mixed together and heated to 270° C. at a rate of 10° C./min under an argon atmosphere with magnetic stirring. When the temperature reached 270° C., $Ir(acac)_3$ (0.64 mg) dispersed in benzyl ether (3.0 mL) was added dropwise for 30 minutes. Next, the reaction mixture was heated at 270° C. for 5 hours. The resulting dispersion was naturally cooled at room temperature, and then toluene (5 mL) and ethanol (10 mL) were sequentially added to precipitate the carbon-supported platinum nanocubes surface-decorated with iridium. The supernatant was removed by centrifugation at 3,000 rpm for 5 minutes, and the carbon-supported platinum nanocubes surface-decorated with iridium (Ir—Pt NCs/C) were collected through washing three times with ethanol and toluene and then drying at room temperature under an argon atmosphere.

Example 2: Preparation of Carbon-Supported Platinum Nanocubes Surface-Decorated with Iridium and Nickel Hydroxide (Ir, $Ni(OH)_2$—Pt NCs/C)

The carbon-supported platinum nanocubes surface-decorated with iridium (6.8 mg), prepared in Example 1, oleylamine (5.0 mL), and benzylether (5.0 mL) were mixed together and heated to 190° C. at a rate of 7° C./min under an argon atmosphere with magnetic stirring. When the temperature reached 190° C., $Ni(NO_3)_2 6H_2O$ (0.34 mg) dispersed in benzyl alcohol (0.3 mL) was added to the suspension and kept at 190° C. for 30 minutes. The resulting dispersion was naturally cooled at room temperature, and then toluene (5 mL) and ethanol (10 mL) were sequentially added to precipitate the carbon-supported platinum nanocubes surface-decorated with iridium and nickel hydroxide. The supernatant was removed by centrifugation at 3,000 rpm for 5 minutes, and the carbon-supported platinum nanocubes surface-decorated with iridium and nickel hydroxide (Ir, $Ni(OH)_2$—Pt NCs/C) were collected through washing three times with ethanol and toluene and then drying at room temperature under an argon atmosphere.

Experimental Example 1: Observation of TEM, HR-TEM and EDS Mapping Images

HT 7100 microscope (Hitachi, Japan) was used to obtain transmission electron microscope (TEM) images of the catalysts prepared in Preparation Examples 1 and 2 and Examples 1 and 2.

In addition, JEM-2100F (JEOL, Japan) and Titan G2 ChemiSTEM Cs probe (FEI, USA), working at 200 kV acceleration voltage, were used to obtain selected area electron diffraction (SAED) patterns and high-resolution TEM (HR-TEM) images of the catalysts prepared in Preparation Example 1 and Examples 1 and 2.

In addition, energy dispersive X-ray spectrometry (EDS) of the catalysts prepared in Examples 1 and 2 was analyzed and imaged using the same instrument.

FIG. 1 shows TEM images (A, B, D and G) of the catalysts of Preparation Examples 1 and 2 and Examples 1 and 2, HR-TEM images and SAED patterns (insets) (C, E and H) of the catalysts prepared in Preparation Example 1 and Examples 1 and 2, and EDS mapping images (F and I) of the catalysts of Examples 1 and 2.

Referring to FIGS. 1A, 1B, 1D and 1G, it can be confirmed that the Pt NCs prepared in Preparation Example 1 had a regular cubic shape with an average edge length of 10.8±1.0 nm, and in the case of the Pt NCs/C prepared in Preparation Example 2, Pt NCs were well dispersed on the carbon support, and the catalysts of Examples 1 and 2 had a cubic shape.

Referring to FIG. 1C, it can be seen that the Pt NCs of Preparation Example 1 had a d-spacing of 0.196 nm, and from the SAED patterns in the inset, it can be confirmed that the crystal structure was a face-centered-cubic (FCC) structure. Referring to FIGS. 1E and 1H together with FIG. 1C, it can be confirmed that the catalysts of Examples 1 and 2 had the same lattice pattern spacing and maintained the face-centered cubic structure even though they were subjected to the process of decorating the surface with iridium or iridium and nickel hydroxide. That is, it can be confirmed that decoration of the surface with iridium or iridium and nickel hydroxide was simple decoration of the nanocube surface without forming an alloy with the Pt NCs.

Referring to FIGS. 1F and 1I, it can be confirmed that iridium was randomly distributed on the decorated nanocube surface and nickel hydroxide was also randomly distributed on the surface.

Experimental Example 2: Observation of XRD Patterns

X-ray diffractometer (Bruker, USA) was used to get X-ray diffraction (XRD) results for the catalysts of Preparation Example 2 and Examples 1 and 2.

Figure 2:
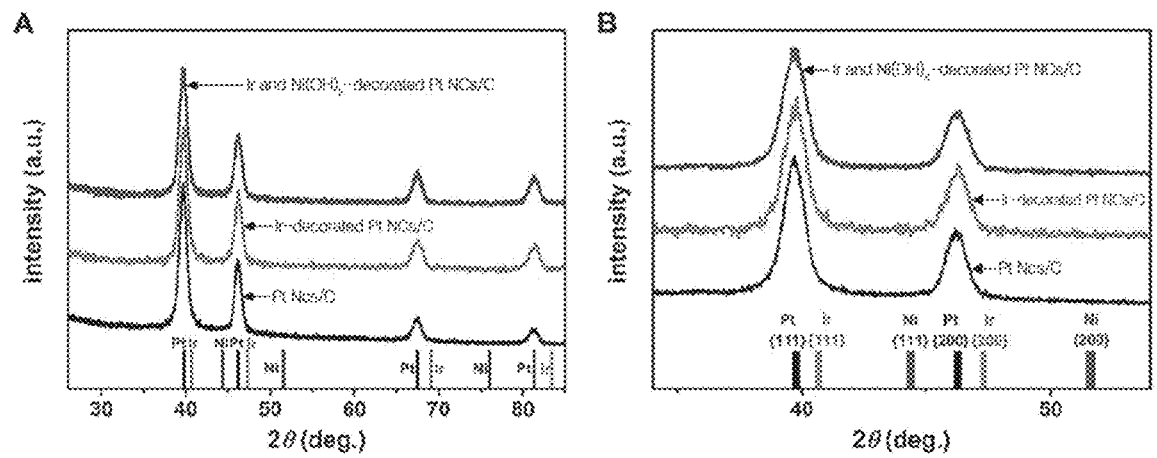
FIG. 2 shows XRD analysis results for Preparation Example 2, Example 1 and Example 2.

FIG. 2 shows XRD analysis results for the catalysts of Preparation Example 2 and Examples 1 and 2. Specifically, FIG. 2A shows XRD patterns of Pt NCs/C of Preparation Example 2, Ir—Pt NCs/C of Example 1 and Ir, Ni(OH)$_2$—Pt NCs/C of Example 2 in the 2θ range of 20° to 90°, and FIG. 2B shows XRD patterns of these catalysts in the 2θ range of 30° to 60°.

Referring to FIG. 2, it can be confirmed that Ir—Pt NCs/C of Example 1 and Ir, Ni(OH)$_2$—Pt NCs/C of Example 2 had the same Pt peak positions as Pt NCs/C of Preparation Example 2, other peaks related with Ir and Ni were not observed, and no remarkable peak shift was also observed, suggesting that, in the case of Ir—Pt NCs/C of Example 1 and Ir, Ni(OH)$_2$—Pt NCs/C of Example 2, there was no alloying between the platinum nanocubes and iridium or iridium and nickel hydroxide.

Experimental Example 3: Observation of XPS Patterns

X-ray photoelectron spectroscopy (XPS) of the catalysts of Examples 1 and 2 was conducted using a spectrometer (Thermofisher Scientific, USA) with the light source being Al Kα X-ray (1486.6 eV). The C1s peak at 284.8 eV was used as a reference.

Figure 3:
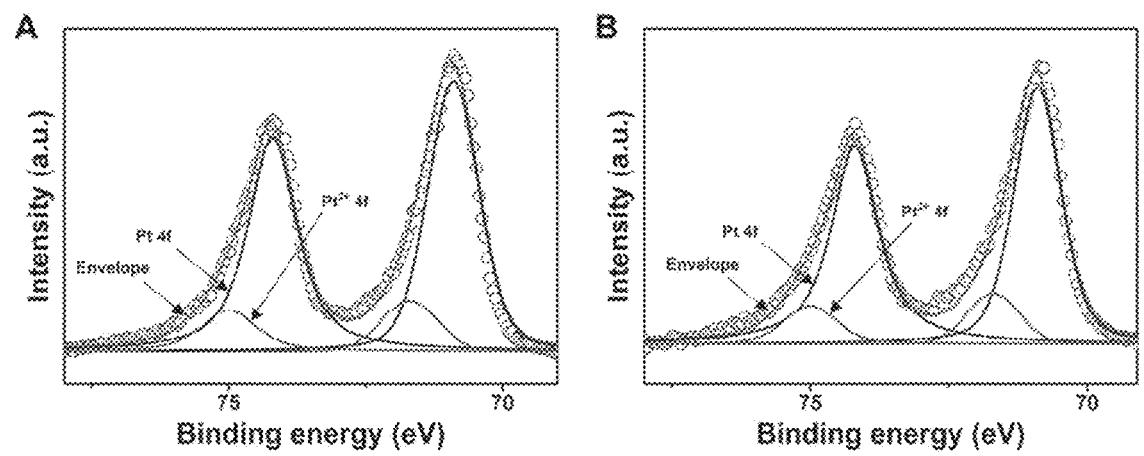
FIG. 3 shows XPS data of Examples 1 and 2.

FIG. 3 shows XPS data for the catalysts of Examples 1 and 2. Specifically, FIG. 3A shows XPS data for Ir—Pt NCs/C of Example 1, and FIG. 3B shows XPS data for Ir, Ni(OH)$_2$—Pt NCs/C of Example 2.

Referring to FIG. 3, it can be confirmed that, in the XPS spectra of Ir—Pt NCs/C of Example 1 and Ir, Ni(OH)$_2$—Pt NCs/C of Example 2, the Pt 4f peak (blue) and the Pt$^{2+}$ 4f peak (green) appeared (black circle) without peak shift. That is, it can be confirmed that, in the case of Ir—Pt NCs/C of Example 1 and Ir, Ni (OH)$_2$—Pt NCs/C of Example 2, no platinum alloy was not formed, which is consistent with the result of XRD analysis.

Experimental Example 4: ICP-MS Analysis

Inductively coupled plasma-mass spectrometry (ICP-MS, PerkinElmer, NexION 300X, USA) was used to analyze the metal compositions in Ir—Pt NCs/C of Example 1 and Ir, Ni(OH)$_2$—Pt NCs/C of Example 2.

Table 1 below shows the atomic ratios of the catalysts of Examples 1 and 2, obtained by ICP-MS.

TABLE 1

| Catalyst | Atomic ratio (Pt:Ir:Ni) |
| --- | --- |
| Example 1 (Ir—Pt NCs/C) | 53.2:1.0:— |
| Example 2 (Ir, Ni(OH)$_2$—Pt NCs/C) | 53.8:1.0:4.3 |

Referring to Table 1 above, it can be confirmed that the catalysts of Examples 1 and 2 contained trace amounts of iridium and/or nickel.

Examples 3 and 4 and Reference Example 1: Formation of Three-Electrode System A standard three-electrode system was used to conduct electrochemical measurements.

Catalyst ink containing the catalyst of Example 1, Example 2 or Preparation Example 2 was carefully placed on a glassy carbon electrode having a diameter of 5 mm. Then, the ink was dried in air to attain about 125 μg/cm$^2$ of metal loading, thus preparing working electrodes of Example 3, Example 4 and Reference Example 1. As the counter electrode and the reference electrode, a Pt wire and an Hg/HgO electrode with a reversible hydrogen electrode (RHE) calibration were respectively used to form a three-electrode system. As the electrolyte, one specified in each Experimental Example was used.

Experimental Example 5: Observation of Cyclic Voltammetry (CV)

Cyclic voltammetry (CV) was performed. For electrochemical cleaning of the catalyst surface of the three-electrode system comprising each of the working electrodes of Example 3, Example 4 and Reference Example 1, cycling of the working electrode was carried out from 0.05 V and 1.1 V for 10 cycles in a 0.1 M KOH solution saturated with Ar at a scan rate of 100 mV/s. Then, a standard CV curve was recorded by performing CV at a scan rate of 50 mV/s in the potential range of 0.05 to 1.2 V$_{RHE}$.

Figure 4:
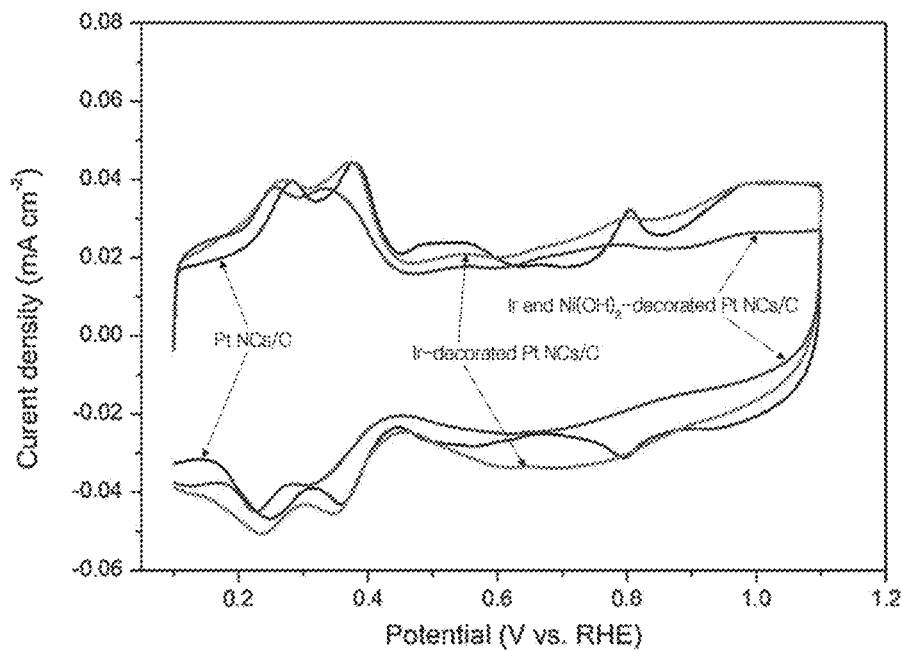
FIG. 4 shows CV curves of three-electrode systems including the working electrodes of Examples 3 and 4 and Reference Example 1.

FIG. 4 shows CV curves of the three-electrode systems comprising the working electrodes of Example 3, Example 4 and Reference Example 1, respectively.

Referring to FIG. 4, it can be confirmed that Example 3, Example 4 and Reference Example 1 all exhibited hydrogen desorption and adsorption peaks below 0.40 V$_{RHE}$, and also exhibited the double layer as well as the platinum oxidation/reduction regions. It can be found that the region of hydrogen desorption consists of two to three peaks which are assigned to hydrogen desorption on Pt (110) sites, Pt (100) step sites and long-range Pt (100) terrace domains, respective with increases in potential. In particular, it can be confirmed that a peak at 0.48 V$_{RHE}$ representing the Pt (100) terraces of long range in Reference Example 1 disappeared in the curves of Examples 1 and 2, indicating that Pt (100) surfaces were decorated with iridium or iridium and nickel hydroxide.

In addition, peaks for OH adsorption and desorption in both positive and negative scans were also observed, especially for Reference Example 1 at 0.8 V$_{RHE}$. When the platinum surface is decorated with more oxophilic components than platinum such as iridium or metal hydroxide (nickel hydroxide), it can be confirmed that such peaks become less prominent and potential for OH adsorption also decreases.

The irreversible adsorption of Ge was used to investigate the larger Pt (100) terrace domains on nanocubes. Specifically, in the three-electrode systems comprising the working electrodes of Examples 3 and 4 and Reference Example 1, a 0.01 M $GeO_2$+1 M NaOH solution was used as an electrolyte, and a potential of 0.85 $V_{RHE}$ was applied for 1 min. Then, the working electrode was quickly transferred to a 0.5 m $H_2SO_4$ solution and a $GeO_2$ solution was dropped on the surface of the working electrode. CV curves were recorded by conducting CV in the potential range of 0.04 to 0.64 $V_{RHE}$ at a scan rate of 50 mV/s.

Figure 5:
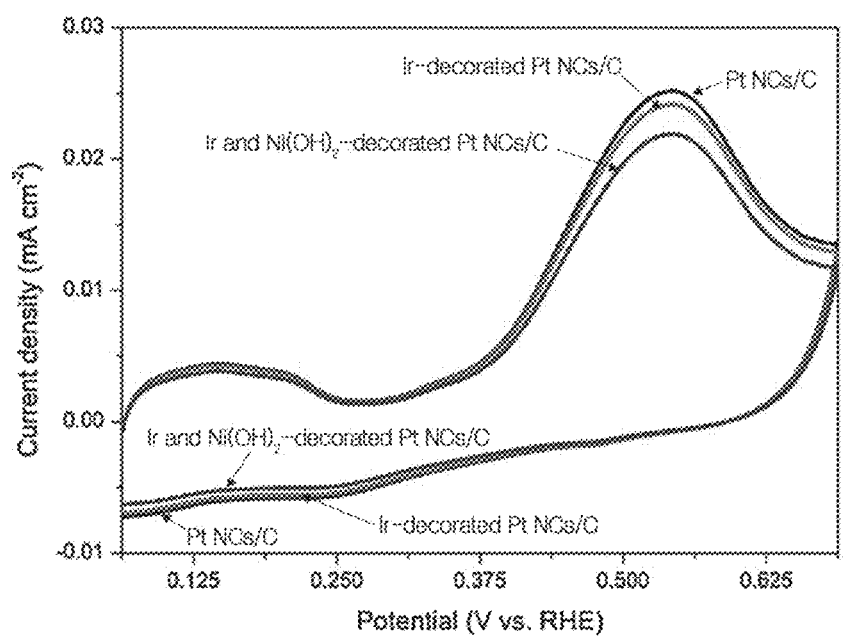
FIG. 5 shows Ge adsorption/desorption CV curves of three-electrode systems including the working electrodes of Examples 3 and 4 and Reference Example 1.

FIG. 5 shows Ge adsorption/desorption CV curves of the three-electrode systems comprising the working electrodes of Examples 3 and 4 and Reference Example 1, respectively.

Referring to FIG. 5, it can be confirmed that it can be confirmed that a broad oxidation peak around 0.54$V_{RHE}$ appeared for all Examples 3 and 4 and Reference Example 1, indicating the Ge adatoms on Pt (100) terrace sites. Furthermore, the oxidation current for Reference Example 1 and Example 3 were 0.0251 mA/cm$^2$ and 0.0244 mA/cm$^2$, respectively, showing very similar values. This can mean that Pt (100) terrace domains were preserved even after surface decoration with iridium. Meanwhile, the oxidation current for Example 4 was 0.0211 mA/cm$^2$, which decreased by about 15.9% compared to that for Reference Example 1, suggesting that Pt (100) terrace domains were reduced due to $Ni(OH)_2$ adsorption.

In addition, to determine the intrinsic activity of the catalyst, the electrochemical active surface area (ECSA) was measured. Specifically, in the three-electrode systems comprising the working electrodes of Examples 3 and 4 and Reference Example 1, a 50 mM $H_2SO_4$+50 mM $CuSO_4$ solution saturated with argon was used as an electrolyte, and the ECSA was calculated through the Cu underpotential deposition charge (UPD) curve at a scan rate of 5 mV/s. Here, a surface charge density of 420 μC/cm$^2$ was considered.

Table 2 below shows ECSAs calculated through Cu UPD curves of the three-electrode systems comprising the working electrodes of Examples 3 and 4 and Reference Example 1.

Figure 6:
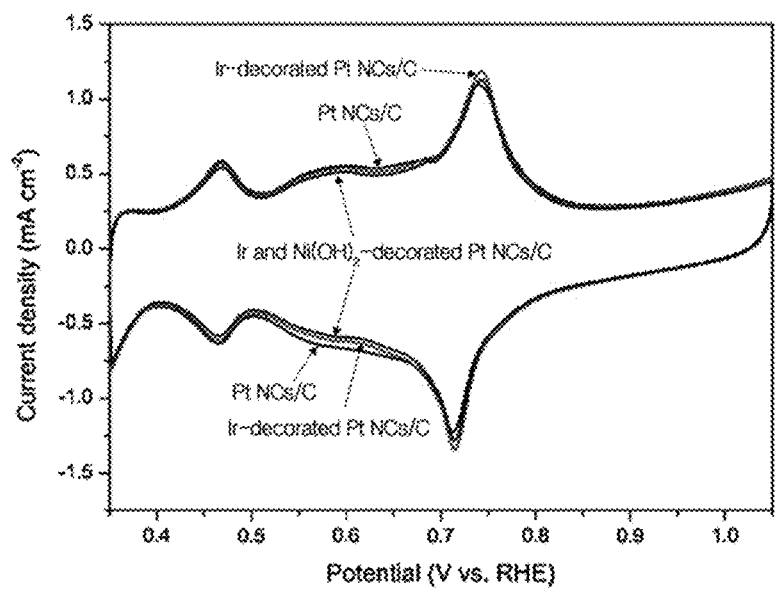
FIG. 6 shows Cu UPD curves of three-electrode systems including the working electrodes of Examples 3 and 4 and Reference Example 1.

In addition, FIG. 6 shows Cu UPD curves of the three-electrode systems comprising the working electrodes of Examples 3 and 4 and Reference Example 1, respectively.

TABLE 2

| | ECSA (m$^2$/g) |
|---|---|
| Example 3 | 21 |
| Example 4 | 19 |
| Reference Example 1 | 18 |

Referring to Table 2, it can be confirmed that the catalyst included in the working electrode of Example 3, that is, the catalyst of Example 1, had the largest ECSA and a wide active area, and thus exhibited excellent catalytic activity.

Example 6: Observation of Linear Sweep Voltammetry Graph

The electrocatalytic activities of the working electrodes of Examples 3 and 4 and Reference Example 1 in ammonia oxidation reaction were analyzed. Specifically, in the three-electrode systems comprising the working electrodes of Examples 3 and 4 and Reference Example 1, a 0.1 M KOH+0.1 M $NH_3$ solution deaerated by passing argon therethrough was used as an electrolyte, and LSV curves were recorded by conducting linear sweep voltammetry (LSV) at a scan rate of 50 mV/s.

Figure 7:
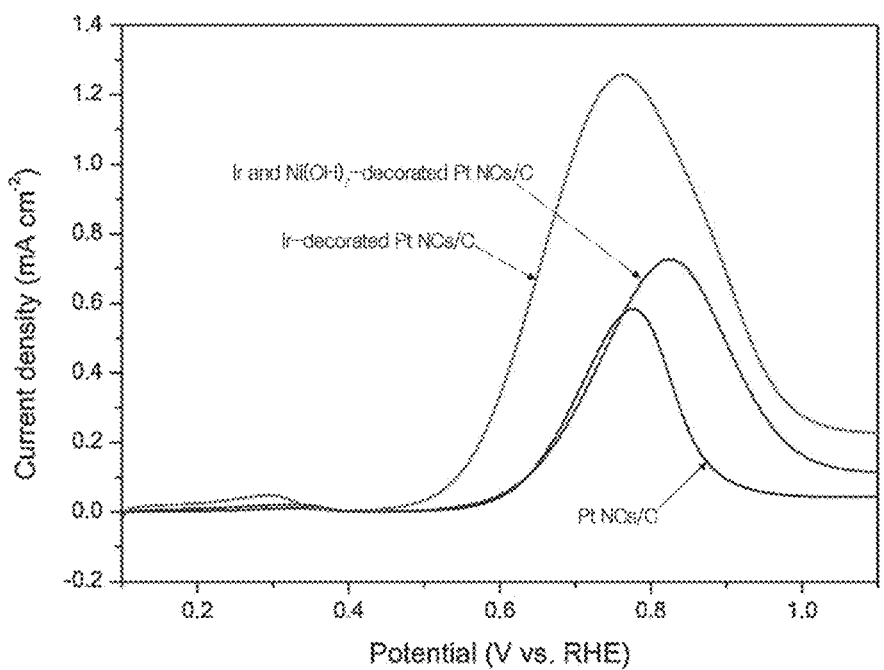
FIG. 7 shows LSV curves of three-electrode systems including the working electrodes of Examples 3 and 4 and Reference Example 1.

FIG. 7 shows LSV curves of the three-electrode systems comprising the working electrodes of Examples 3 and 4 and Reference Example 1. Here, electric current was normalized by the ECSAs shown in Table 2 above.

Referring to FIG. 7, it can be confirmed that Examples 3 and 4 and Reference Example 1 all showed a characteristic ammonia oxidation peak in the range of 0.75 to 0.82 $V_{RHE}$. It can be confirmed that the specific activity of Example 3 was 1.25 mA cm$^2$, which was about 2.15 times higher than that of Reference Example 1 (0.58 mA cm$^2$). That is, it can be confirmed that the surface decoration with a trace amount of iridium could increase the ammonia oxidation activity of the carbon-supported platinum nanocubes of Reference Example 1 by more than twice. This suggests that surface decoration with iridium did not block much of the Pt (100) terrace domains as confirmed in the above-described results.

Meanwhile it can be confirmed that Example 4 exhibited an activity of 0.72 mA/cm$^2$, which was 41% higher than Reference Example 1 but 42% lower than Example 3. This can be explained by the presence of Ni $(OH)_2$ that is inactive for ammonia oxidation reaction as well as adsorption of Pt (100) terrace domains with Ni $(OH)_2$ as mentioned in the analysis results shown in FIG. 5.

Therefore, it can be confirmed that Examples 3 and 4 have excellent ammonia oxidation activity, and in particular, Example 3 has the best ammonia oxidation activity.

In addition, in terms of onset potential, it can be confirmed that Example 3 showed the lowest value (0.43 $V_{RHE}$) and a small pre-peak around 0.30 $V_{RHE}$.

Experimental Example 7: Evaluation of Catalyst Stability

For the three-electrode systems comprising the working electrodes of Examples 3 and 4 and Reference Example 1, chronoamperometry curves were recorded by conducting chronoamperometry at a potential of 0.6 $V_{RHE}$ for 600 seconds using CHI 760 and 627e potentiostat (CH Instrument) and using a 0.1M KOH+0.1M $NH_3$ solution as an electrolyte.

Figure 8:
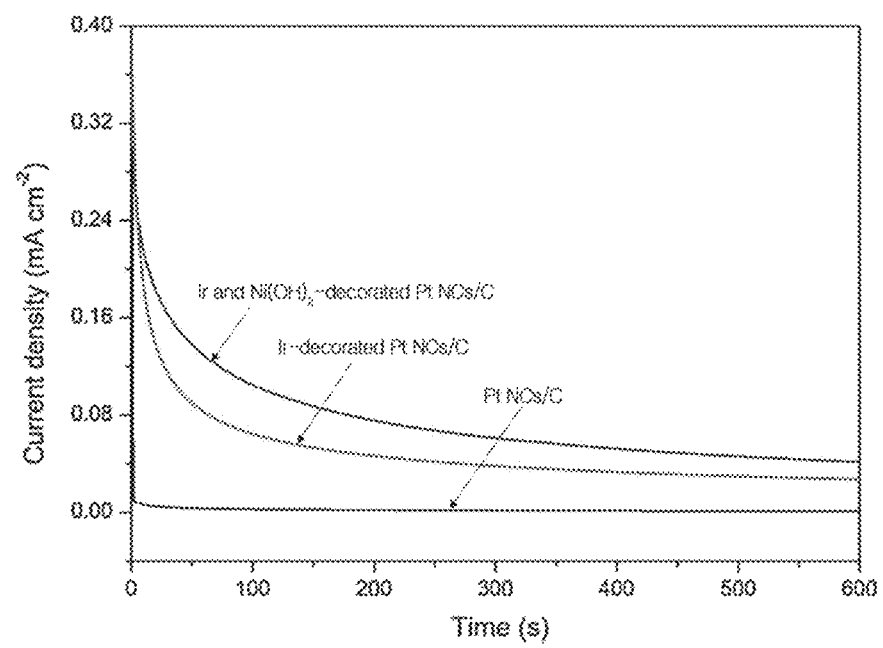
FIG. 8 shows chronoamperometric curves of three-electrode systems including the working electrodes of Examples 3 and 4 and Reference Example 1.

FIG. 8 shows chronoamperometry curves of the three-electrode systems comprising the working electrodes of Examples 3 and 4 and Reference Example 1.

Referring to FIG. 8, it can be confirmed that Reference Example 1 had poor stability, because the current density decreased by 95% or less within few seconds. However, it can be confirmed that Example 3 had relatively good stability, because the initial decay within 100 seconds was about 90%. This suggests that iridium sites have better resistance than platinum sites to nitrogen poisoning.

It can be confirmed that the catalyst of Example 4 had excellent stability, because the initial decay within 100 seconds were only 66%. This can be attributed to poison resistance by both iridium and nickel hydroxide, and it can be confirmed that the catalyst of Example 2 had excellent stability.

Although the present invention has been described above by way of limited embodiments, the present invention is not limited to these embodiments. Those skilled in the art to which the present invention pertains will appreciate that modifications and variations are possible without departing from the technical idea of the present invention and the scope of equivalents to the appended claims.

What is claimed is:

1. A method for preparing a carbon-supported and surface-engineered platinum nanocubes catalyst, said catalyst comprising:
a carbon-based support;
platinum nanocubes supported on the carbon-based support; and
individual iridium atoms with which surfaces of the platinum nanocubes are coated,
the method comprising the steps of:
preparing platinum nanocubes;
preparing carbon-supported platinum nanocubes by supporting the platinum nanocubes on carbon; and
preparing carbon-supported platinum nanocubes surface-coated with iridium atoms by coating the surfaces of the carbon-supported platinum nanocubes with iridium atoms.

2. The method of claim 1, wherein the step of preparing the platinum nanocubes comprises:
heating a first solution containing a platinum precursor to a first temperature;
heating the first solution, heated to the first temperature, to a second temperature while bubbling carbon monoxide; and
maintaining the first solution, heated to the second temperature, at the second temperature.

3. The method of claim 2, wherein the first temperature is 100° C. to 150° C., and the second temperature is 200° C. to 300° C.

4. The method of claim 2, wherein the bubbling the carbon monoxide is performed by injecting carbon monoxide at a flow rate of 20 ml/min to 40 ml/min.

5. The method of claim 2, wherein the step of heating the first solution to the second temperature is performed at a heating rate of 5° C./min to 10° C./min.

6. The method of claim 2, wherein the step of maintaining the first solution at the second temperature is performed for 30 minutes to 60 minutes.

7. The method of claim 1, wherein the step of preparing the carbon-supported platinum nanocubes surface-coated with iridium atoms by coating the surfaces of the carbon-supported platinum nanocubes with iridium atoms comprises steps of:
heating a first dispersion containing the carbon-supported platinum nanocubes, a reducing agent and a solvent to a third temperature; and
adding a second solution containing an iridium precursor to the first dispersion heated to the third temperature, and maintaining at the third temperature.

8. The method of claim 7, wherein the second solution is added dropwise.

9. The method of claim 7, wherein the second solution is added such that a weight ratio of the carbon-supported platinum nanocubes to the iridium precursor is 150:1 to 10:1.

10. The method of claim 7, wherein the third temperature is 200° C. to 300° C.

11. The method of claim 7, wherein the step of maintaining at the third temperature is performed for 3 hours to 10 hours.

12. The method of claim 1, further comprising, after the step of preparing the carbon-supported platinum nanocubes surface-coated with iridium atoms by coating the surfaces of the carbon-supported platinum nanocubes with iridium atoms, a step of decorating coating the surfaces of the carbon-supported platinum nanocubes, surface-coated with iridium atoms, with nickel hydroxide clusters.

13. The method of claim 12, wherein the step of decorating coating the surfaces of the carbon-supported platinum nanocubes, surface-coated with iridium atoms, with nickel hydroxide clusters comprises steps of:
heating a second dispersion containing the carbon-supported platinum nanocubes surface-coated with iridium atoms, a reducing agent, and a solvent to a fourth temperature lower than 200° C.; and
adding a third solution containing a nickel precursor to the second dispersion heated to the fourth temperature, and maintaining at the fourth temperature.

14. The method of claim 13, wherein the reducing agent comprises at least one of oleylamine, 1,2-hexanediol, n-octylamine, and pentadecylamine.

15. The method of claim 7, wherein the reducing agent comprises at least one of oleylamine, 1,2-hexanediol, n-octylamine, and pentadecylamine.

* * * * *

UNITED STATES PATENT AND TRADEMARK OFFICE
CERTIFICATE OF CORRECTION

PATENT NO. : 12,331,411 B2  
APPLICATION NO. : 17/672769  
DATED : June 17, 2025  
INVENTOR(S) : Choi et al.

Page 1 of 1

It is certified that error appears in the above-identified patent and that said Letters Patent is hereby corrected as shown below:

In the Claims

Column 20, Line 22, Claim 12: Please correct "step of decorating coating" to read --step of coating--

Column 20, Lines 25-26, Claim 13: Please correct "step of decorating coating" to read --step of coating--

Column 20, Line 39, Claim 15: Please correct "claim 7" to read --claim 13--

Signed and Sealed this  
Ninth Day of December, 2025

John A. Squires  
*Director of the United States Patent and Trademark Office*